(12) United States Patent
Sun et al.

(10) Patent No.: US 12,722,504 B2
(45) Date of Patent: Sep. 1, 2026

(54) BATTERY PACK AND VEHICLE

(71) Applicant: BYD COMPANY LIMITED, Shenzhen (CN)

(72) Inventors: Huajun Sun, Shenzhen (CN); Qingbo Peng, Shenzhen (CN); Shichao Hu, Shenzhen (CN); Yan Zhu, Shenzhen (CN); Xin Gao, Shenzhen (CN)

(73) Assignee: BYD Company Limited, Shenzhen (CN)

(*) Notice: Subject to any disclaimer, the term of this patent is extended or adjusted under 35 U.S.C. 154(b) by 666 days.

(21) Appl. No.: 17/797,370

(22) PCT Filed: Feb. 4, 2021

(86) PCT No.: PCT/CN2021/075316
§ 371 (c)(1),
(2) Date: Aug. 3, 2022

(87) PCT Pub. No.: WO2021/164568
PCT Pub. Date: Aug. 26, 2021

(65) Prior Publication Data

US 2023/0055300 A1 Feb. 23, 2023

(30) Foreign Application Priority Data

Feb. 18, 2020 (CN) ........................ 202010099365.X

(51) Int. Cl.
*B60L 50/64* (2019.01)
*B60L 50/60* (2019.01)
(Continued)

(52) U.S. Cl.
CPC ............... *B60L 50/64* (2019.02); *B60L 50/66* (2019.02); *H01M 50/119* (2021.01);
(Continued)

(58) Field of Classification Search
CPC ...... B60L 53/64; B60L 53/66; H01M 50/249; H01M 50/548; H01M 50/209; H01M 50/119; H01M 2220/20
See application file for complete search history.

(56) References Cited

U.S. PATENT DOCUMENTS

2005/0208374 A1* 9/2005 Sakurai ................ H01M 6/425 429/162
2014/0158444 A1* 6/2014 Han ................... H01M 50/244 180/68.5
(Continued)

FOREIGN PATENT DOCUMENTS

CN 107658401 A 2/2018
CN 108780856 A 11/2018
(Continued)

OTHER PUBLICATIONS

Machine translation JP2017228391A (Year: 2025).*
(Continued)

*Primary Examiner* — Brian R Ohara
*Assistant Examiner* — M. T. Leonard
(74) *Attorney, Agent, or Firm* — Sheppard Mullin Richter & Hampton LLP

(57) ABSTRACT

A battery pack and a vehicle are provided. The battery pack is fixed to the vehicle and is configured to provide electric energy for the vehicle. The battery pack includes a cell array. The cell array includes at least one cell. The cell includes electrode terminals for leading out current. A first direction is defined as a front-to-rear direction of the vehicle. The electrode terminals are oriented parallel to the first direction.

21 Claims, 6 Drawing Sheets

(51) Int. Cl.

| | |
|---|---|
| ***H01M 50/119*** | (2021.01) |
| ***H01M 50/209*** | (2021.01) |
| ***H01M 50/249*** | (2021.01) |
| ***H01M 50/548*** | (2021.01) |

(52) U.S. Cl.

CPC ....... *H01M 50/209* (2021.01); *H01M 50/249* (2021.01); *H01M 50/548* (2021.01); *H01M 2220/20* (2013.01)

(56) References Cited

U.S. PATENT DOCUMENTS

| | | | | |
|---|---|---|---|---|
| 2019/0190094 A1* | 6/2019 | Shimizu | ............ | H01M 10/6567 |
| 2020/0044214 A1* | 2/2020 | Obrist | ................ | H01M 10/613 |

FOREIGN PATENT DOCUMENTS

| | | | | | |
|---|---|---|---|---|---|
| CN | 110212134 | A | | 9/2019 | |
| CN | 209389111 | U | | 9/2019 | |
| CN | 110416450 | A | | 11/2019 | |
| CN | 110518156 | A | | 11/2019 | |
| CN | 110518174 | A | | 11/2019 | |
| CN | 110828717 | A | | 2/2020 | |
| CN | 111009629 | A | | 4/2020 | |
| DE | 102017200993 | A1 | * | 7/2018 | .......... H01M 50/271 |
| JP | 2007048523 | A | * | 2/2007 | |
| JP | 2016046113 | A | * | 4/2016 | |
| JP | 2017-228391 | A | | 12/2017 | |
| WO | 2019/185556 | A1 | | 10/2019 | |

OTHER PUBLICATIONS

Machine translation JP2007048523A (Year: 2025).*

Machine translation JP2016046113A (Year: 2025).*

Polypropylene data table, Plastics Packaging—Properties, Processing, Applications, and Regulations (4th Edition) 2021 Hanser Publishers (Year: 2025).*

Nylon data table. Film Extrusion Manual—Process, Materials, Properties (3rd Edition) 2020 Technical Association of the Pulp & Paper Industry (TAPPI). (Year: 2025).*

Machine translation WO2019185556A1 (Year: 2025).*

DE102017200993A1 machine translation (Year: 2026).*

International Search Report and Written Opinion for Application No. PCT/CN2021/075316, mailed on Apr. 26, 2021, 14 pages.

* cited by examiner

BATTERY PACK AND VEHICLE

CROSS-REFERENCE TO RELATED APPLICATIONS

This application is a national phase application of International Patent Application No. PCT/CN2021/075316, filed with the China National Intellectual Property Administration (CNIPA) on Feb. 4, 2021, which is based on and claims priority to and benefits of Chinese Patent application Ser. No. 202010099365.X, filed on Feb. 18, 2020. The entire content of all of the above-identified applications is incorporated herein by reference.

FIELD

The present disclosure relates to the technical field of vehicle manufacturing, and more specifically, to a battery pack and a vehicle including the battery pack.

BACKGROUND

Currently, power battery packs of electric vehicles generally include multiple cells. Each of the cells includes electrode terminals for leading out current. An arrangement of the cells in the whole vehicle is usually subjected to space limitation, and therefore lacks property in terms of maximization of a space utilization and safety of the cells.

In related arts, when the electrode terminals of the cells are oriented toward a height direction of the electric vehicle, the battery pack can only be placed at a bottom of the electric vehicle as a result of a limited height of the electric vehicle. For safety of the cells, electrode cores of the cells are required to be arranged as high as possible. However, in consideration of a space of a passenger compartment and stability of a center of gravity of the whole vehicle, the cells cannot be arranged excessively high, which complicates the arrangement of the cells. In addition, when the electrode terminals of the cells are oriented toward a side direction of the vehicle, that is, a door direction, due to a limited width of the electric vehicle, once a body of the electric vehicle is subjected to an impact in the side direction, the electrode terminals of the cells are easily subjected to a direct impact, which is likely to cause relatively detrimental damage such as a short circuit to the cells.

SUMMARY

The present disclosure resolves at least one of the technical problems in the prior art. The present disclosure provides a battery pack, where electrode terminals therein are less likely to be impacted.

The present disclosure further provides a vehicle having the above battery pack.

The battery pack of the present disclosure is fixed to the vehicle, is configured to provide electric energy for the vehicle, and includes cell arrays. The cell array includes at least one cell. The cell includes electrode terminals for leading out current. A first direction is defined as a front-to-rear direction of the vehicle. The electrode terminals are oriented parallel to the first direction.

In the present disclosure, the electrode terminals of the cell are oriented parallel to the front-to-rear direction of the vehicle, so that the electrode terminals are oriented toward a front of the vehicle or a rear of the vehicle. Compared with the related art in which electrode terminals are oriented toward a side of the vehicle, a relatively large buffer space can be provided between the electrode terminals of the cells and a vehicle body. In this way, impact on the electrode terminals can be relieved when the body of the vehicle is subjected to an impact, and chances that the electrode terminals are impacted are low, thereby preventing relatively detrimental cell damage such as a short circuit of the electrode terminals caused by the impact.

Additional aspects and advantages of the present disclosure are partially provided in the following description, and partially become apparent in the following description or understood through the practice of the present disclosure.

BRIEF DESCRIPTION OF THE DRAWINGS

The foregoing and/or additional aspects and advantages of the present disclosure will become apparent and comprehensible in the description of the embodiments made with reference to the following accompanying drawings.

DETAILED DESCRIPTION

Figures 1, 2:
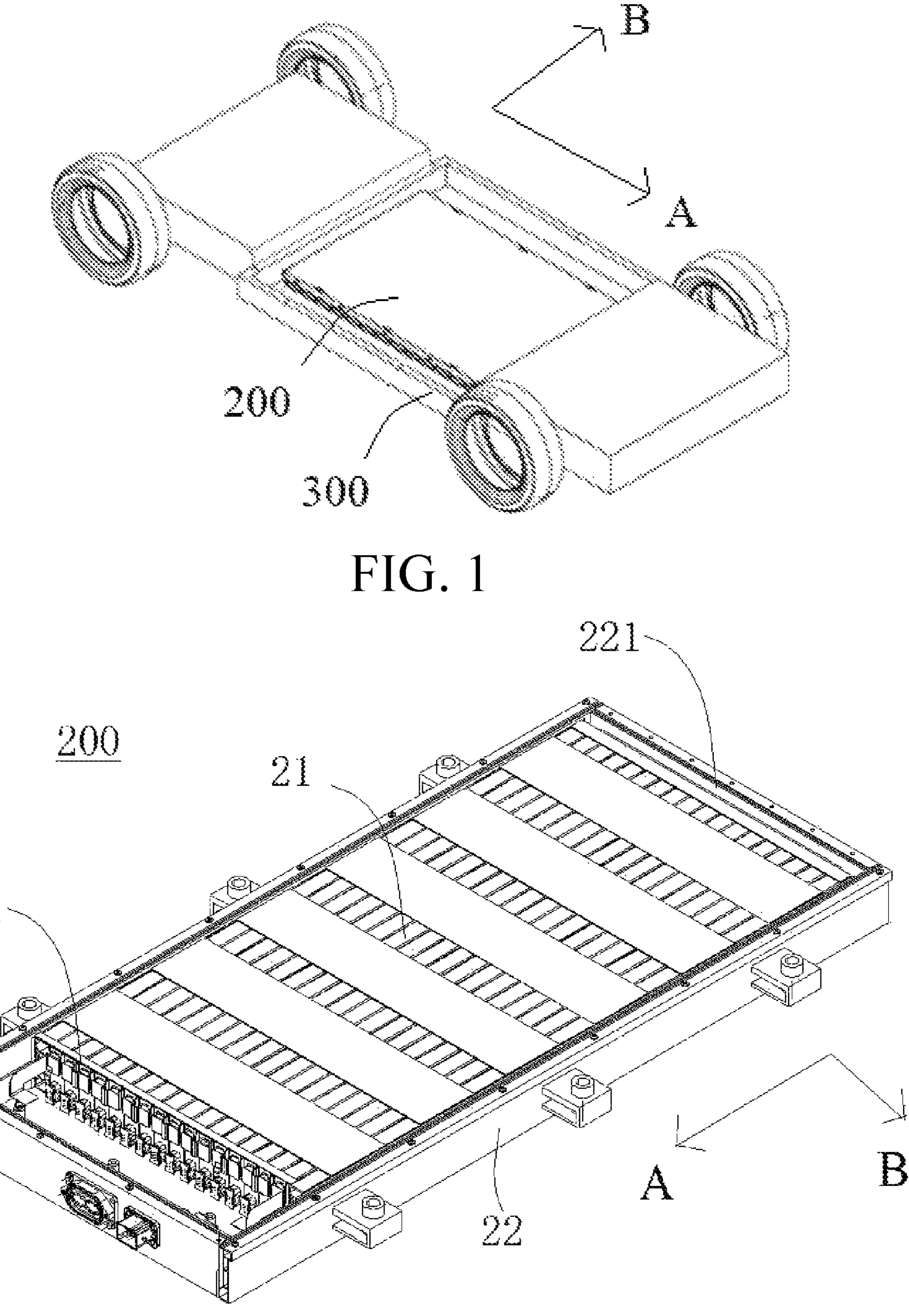
FIG. 1 is a three-dimensional schematic structural diagram of a battery pack fixed to a vehicle according to an embodiment of the present disclosure.
FIG. 2 is a three-dimensional schematic structural diagram of the battery pack according to an embodiment of the present disclosure.

Embodiments of the present disclosure are described in detail below, and examples of the embodiments are shown in accompanying drawings, where the same or similar elements or the elements having same or similar functions are denoted by the same or similar reference numerals throughout the description.

Referring to FIG. 1 to FIG. 5, the present disclosure discloses a battery pack 200. The battery pack is fixed to a vehicle 300 and is configured to provide electric energy for the vehicle 300. Specifically, in this embodiment of the present disclosure, the battery pack 200 may be fixed to a bottom of the vehicle 300. In an embodiment, the battery pack 200 may be arranged at a front of the vehicle or a rear of the vehicle, or may be arranged at a top of the vehicle or even in a compartment. This is not specifically limited. The battery pack 200 includes a cell array 21. The cell array 21 includes at least one cell 100. The cell array 21 includes multiple cells 100, to increase an electric capacity of the cell array 21.

In the present disclosure, the cell 100 includes electrode terminals for leading out current. A first direction A is defined as a front-to-rear direction of the vehicle 300. In this embodiment of the present disclosure, the electrode terminals of the cell 100 are oriented parallel to the first direction A. That is to say, the electrode terminals of the cell 100 may be oriented toward the front of the vehicle, or may be oriented toward the rear of the vehicle.

A length of the vehicle 300 from the front of the vehicle to the rear of the vehicle is greater than a width and a height of the vehicle 300. In the present disclosure, the electrode terminals of the cell 100 are oriented toward the front of the vehicle 300. In an embodiment, the electrode terminals are oriented toward the rear of the vehicle. In an embodiment, at least a part of the electrode terminals is oriented toward the front of the vehicle, and another part of the electrode terminals is oriented toward the rear of the vehicle. Therefore, a relatively large buffer space can be provided between the electrode terminals of the cell 100 and a case of a body of the vehicle 300. In this way, impact on the electrode terminals can be relieved when the body of the vehicle is impacted, and a possibility that the electrode terminals are impacted is reduced.

In this embodiment of the present disclosure, a length of the cell 100 extends along the first direction A. That is to say, a length direction of the cell 100 is the same as a length direction of the vehicle 300, which helps obtain a relatively long cell 100. Therefore, the electric capacity of the cell 100 is increased. In addition, a thickness of the cell 100 extends along a second direction B perpendicular to the first direction A, and the multiple cells 100 are arranged along the second direction B in sequence to form the cell array 21.

Figure 9:
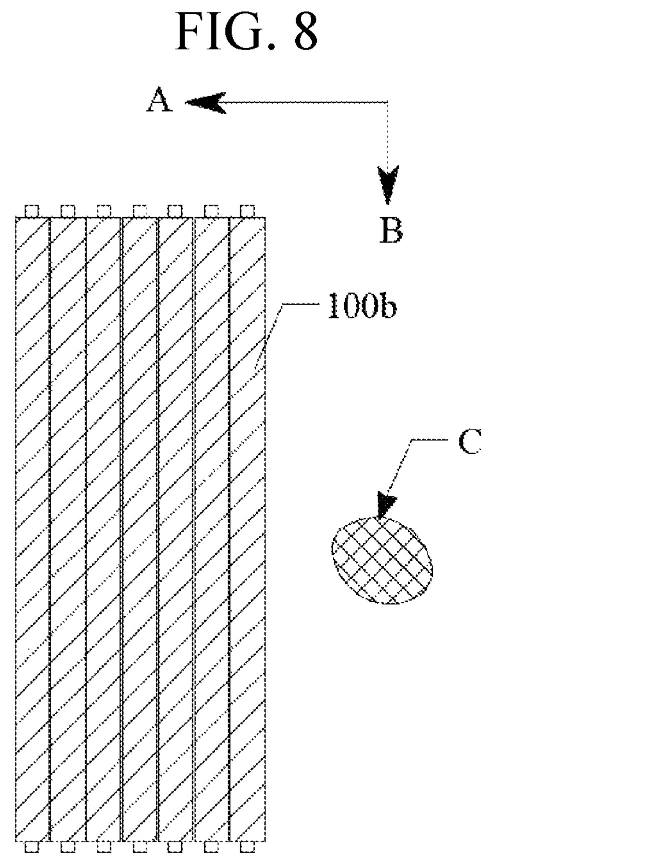
FIG. 9 is a schematic diagram of impact on a cell in a battery pack after a bottom of a vehicle is impacted by a hard object in the related art.

In the related art, the electrode terminals of the cell are oriented toward a side direction of the vehicle (that is, the second direction B perpendicular to the first direction A). As shown in FIG. 9, the multiple cells in the battery pack are arranged along a front-to-rear direction of the vehicle (that is, the first direction A). Therefore, during traveling of the vehicle, when a bottom of the vehicle is impacted by a hard object C, all of the cells in the battery pack on the bottom may be impacted and deformed and broken, resulting in a short circuit of the multiple cells, which tends to injure the vehicle and passengers.

Figure 10:
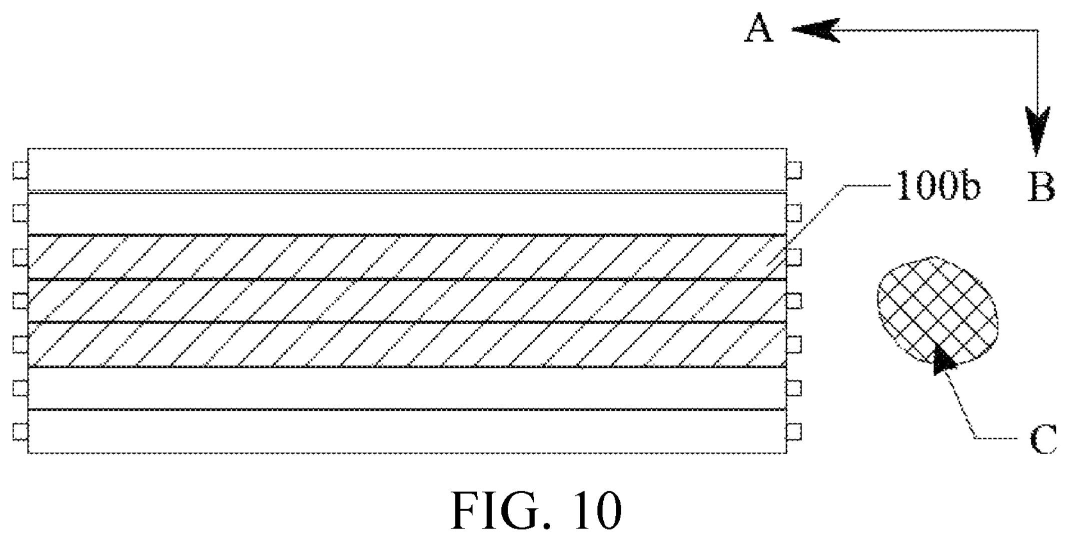
FIG. 10 is a schematic diagram of impact on the cell in the battery pack after a bottom of the vehicle is impacted by a hard object according to an embodiment of the present disclosure.

Unlike the related art, in the present disclosure, as shown in FIG. 10, the multiple cells are arranged along the second direction B perpendicular to a front-to-rear direction of the vehicle. In this way, during the travelling of the vehicle, when the bottom of the vehicle is impacted by the hard object C, fewer cells are affected by the impact of the foreign object, thereby enhancing safety. 100*b* shown in FIG. 9 and FIG. 10 is the cell affected by the impact.

In this embodiment of the present disclosure, the length of the cell 100 extends along the first direction A, and the electrode terminals of the cell 100 include a first electrode terminal 141 and a second electrode terminal 142. The first electrode terminal 141 and the second electrode terminal 142 may be respectively a positive electrode terminal and a negative electrode terminal or the negative electrode terminal and the positive electrode terminal of the cell 100. The first electrode terminal 141 and the second electrode terminal 142 are arranged on an end of the cell 100 in the first direction A. It should be noted that "first" of the first electrode terminal 141 and "second" of the second electrode terminal 142 are merely used for distinguishing between names, and are not used for limiting a quantity. For example, one or more first electrode terminals 141 and one or more second electrode terminals 142 may be arranged.

In other embodiments, the first electrode terminal and the second electrode terminal of the cell 100 may be arranged at other positions on the cell 100. For example, the first electrode terminal and the second electrode terminal may be arranged on two sides of the cell 10 in the second direction B. In addition, the length direction of the cell 100 may be different from the length direction of the vehicle 300. For example, the length direction of the cell 100 is the same as a width direction of the vehicle 300, or may be the same as a height direction of the vehicle 300, as long as the first electrode terminal 141 and the second electrode terminal 142 of the cell 100 are oriented parallel to the front-to-rear direction of the vehicle 300. In this way, a relatively large buffer space can be obtained for the electrode terminals.

In this embodiment of the present disclosure, the first electrode terminal 141 and the second electrode terminal 142 are arranged on a same end of the cell 100 in the first direction A, and the first electrode terminal 141 and the second electrode terminal 142 are oriented toward a same side of the vehicle 300 in the first direction A.

For example, in some embodiments, the first electrode terminal 141 and the second electrode terminal 142 are both oriented toward the front of the vehicle 300. In other embodiments, the first electrode terminal 141 and the second electrode terminal 142 are both oriented toward the rear of the vehicle 300.

In other embodiments, the first electrode terminal 141 and the second electrode terminal 142 are respectively located on two ends of the cell 100 in the first direction A. That is to say, the first electrode terminal 141 and the second electrode terminal 142 are respectively oriented toward the front of the vehicle 300 and the rear of the vehicle.

Figure 3:
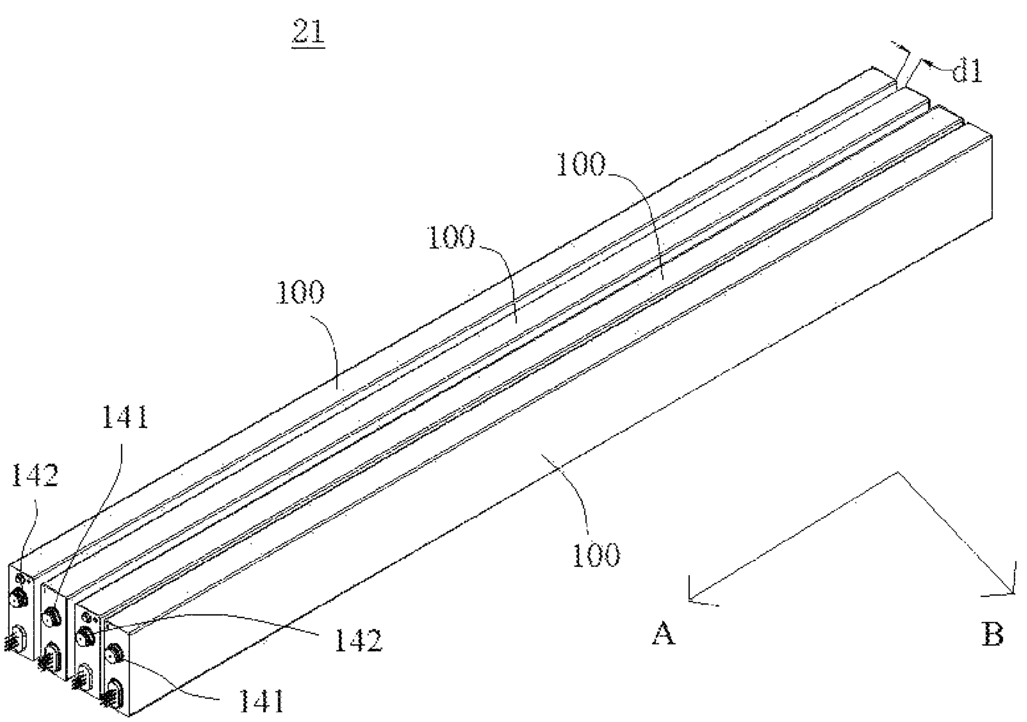
FIG. 3 is a three-dimensional schematic structural diagram of a cell array according to an embodiment of the present disclosure.
Figure 4:
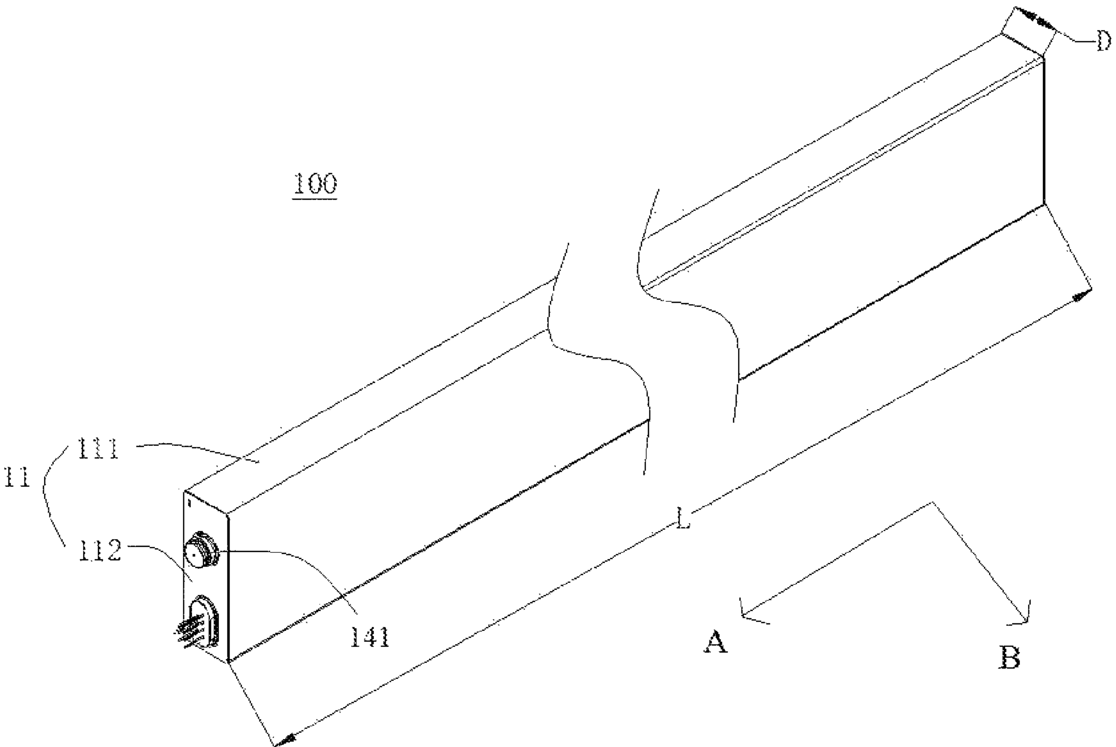
FIG. 4 is a three-dimensional schematic structural diagram of a cell according to an embodiment of the present disclosure.
Figure 5:
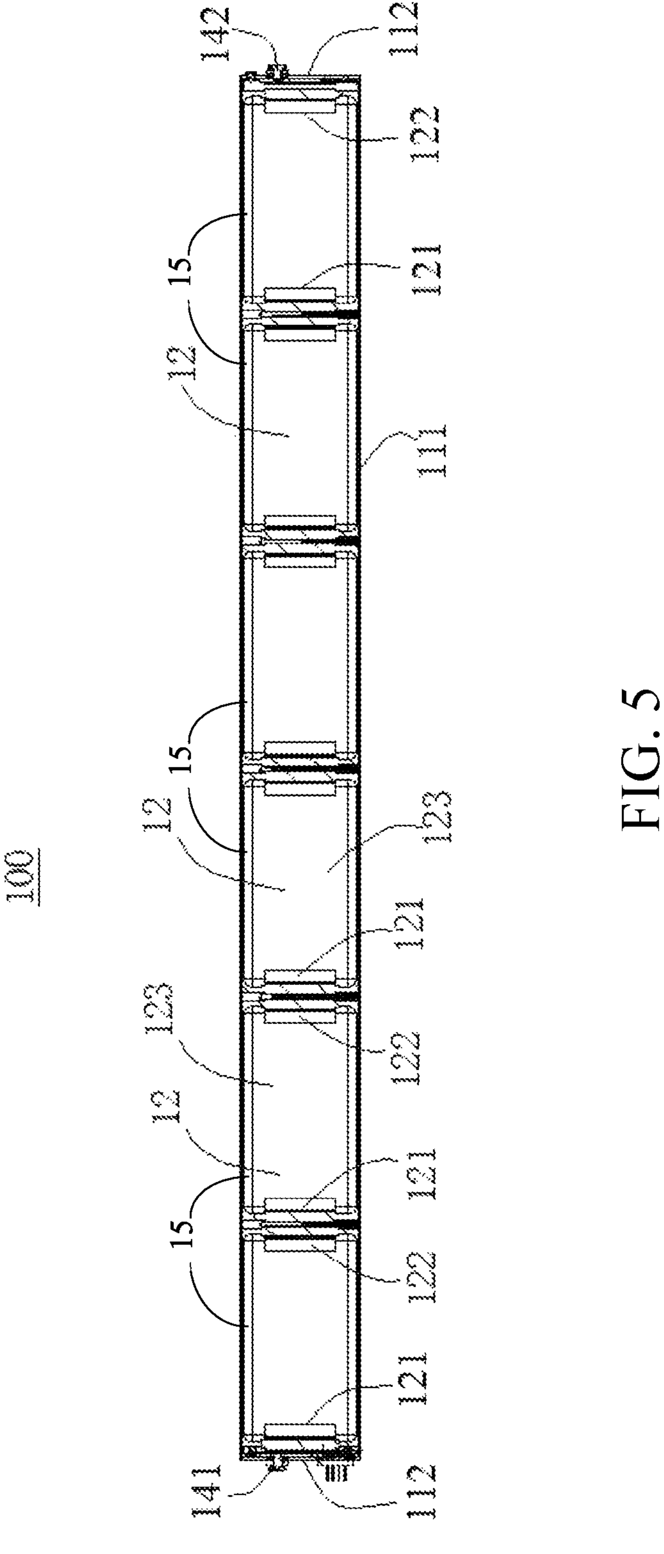
FIG. 5 is a schematic cross-sectional view of the cell according to an embodiment of the present disclosure.

As shown in FIG. 3, in the cell array 21, the multiple cells 100 are arranged along the second direction B perpendicular to the first direction A, and the electrode terminals of adjacent cells 100 on a same side have opposite polarities. That is to say, in the cell array 21, the first electrode terminals of some of the cells 100 are oriented toward the front of the vehicle and the second electrode terminals thereof are oriented toward the rear of the vehicle, and the first electrode terminals of others of the cells 100 are oriented toward the rear of the vehicle and the second electrode terminals thereof are oriented toward the front of the vehicle.

In this embodiment of the present disclosure, the first electrode terminal 141 and the second electrode terminal 142 are respectively located on the two ends of the cell 100 in the first direction A, and the first electrode terminal 141 and the second electrode terminal 142 are respectively oriented toward the front of the vehicle and the rear of the vehicle. In this way, a structure on each end of the cell 100 is simple, thereby facilitating manufacturing and mounting.

In this embodiment of the present disclosure, in order to provide a sufficient buffer space for the electrode terminals, a ratio of the length of the cell 100 to the length of the vehicle 300 is required to be within a proper range. The ratio of the length of the cell 100 to the length of the vehicle 300 may range from 0.2 to 0.8. In this embodiment of the present disclosure, the cell 100 is substantially a cuboid, and the length L of the cell 100 ranges from 600 mm to 2500 mm (millimeters). For example, the length may be 800 mm, 1000 mm, 1500 mm, or the like. When the length of the cell 100 is within the range, an overall structure of the cell 100 is more in line with a standardized design, can be used in different battery packs 200, and has a wide application range. The thickness of the cell 100 extends along the second direction B (that is, the width direction of the vehicle 300) perpendicular to the first direction A. The thickness D of the cell 100 may be greater than 10 mm, for example, may range from 13 mm to 75 mm.

Referring to FIG. 5 to FIG. 8, the cell 100 includes a metal case 11 and multiple electrode core assemblies 12 sealed in the metal case 11 and arranged in sequence along the first direction A. The multiple electrode core assemblies 12 may be connected in series to form an electrode core string 18, and each of the multiple electrode core assemblies 12 includes at least one electrode core.

Each of the multiple electrode core assemblies 12 includes a first electrode 121 and a second electrode 122 for leading out current. The electrode core assembly 12 includes an electrode core assembly body 123 and the first electrode 121 and the second electrode 122 electrically connected with the electrode core assembly body 123. The first electrode 121 and the second electrode 122 are respectively located on two sides of the electrode core assembly body 123 along the first direction A. For two adjacent electrode core assemblies 12, the first electrode 121 of one electrode core assembly 12 is electrically connected with the second electrode 122 of the other electrode core assembly 12 to realize series connection. By connecting the multiple electrode core assemblies 12 in series, the capacity and a voltage of the cell 100 can be improved, and manufacturing processes and costs can be reduced.

The series connection in this embodiment may be series connection between two adjacent electrode core assemblies 12. In a specific implementation, the first electrode 121 and the second electrode 122 on two adjacent electrode core assemblies 12 may be directly connected, or may be electrically connected by an additional conductive component. If the electrode core assembly 12 includes only one electrode core, the first electrode 121 and the second electrode 122 may be respectively a positive tab and a negative tab or the negative tab and the positive tab of the electrode core. If the electrode core assembly includes multiple electrode cores, lead-out members of the first electrode 121 and the second electrode 122 may be electrode leads. "First" of the first electrode terminal 121 and "second" of the second electrode terminal 122 are merely used for distinguishing between names, and are not used for limiting a quantity. For example, one or more first electrode terminals 121 and one or more second electrode terminal 122 may be arranged.

The metal case 11 includes a case body 111 with an opening and a cover plate 112. The cover plate 112 is hermetically connected with the opening of the case body 11 to jointly define a hermetical accommodating chamber 15. The electrode core string 18 formed by the multiple electrode core assemblies 12 connected in series is accommodated in the accommodating chamber 15. Two ends of the electrode core string 18 respectively include a third electrode 126 and a fourth electrode 127. The third electrode 126 of the electrode core string 18 is the first electrode 121 of the electrode core assembly 12 located on one end of the electrode core string 18, and the fourth electrode 127 of the electrode core string 18 is the second electrode 122 of the electrode core assembly 12 located on another end of the electrode core string 18.

In some embodiments, the first electrode and the second electrode located on the two ends of the electrode core string are led out through the cover plate 112, so as to respectively form the first electrode terminal 141 and the second electrode terminal 142 of the cell 100.

In some implementations, the case body 111 may be provided with openings on two ends, and two cover plates 112 may be arranged. The two cover plates 112 are respectively hermetically connected with the openings on the two ends of the case body 111 to form a hermetical accommodating chamber. In this manner, the first electrode and the second electrode located on the two ends of the electrode core string may be respectively led out through the two cover plates 112 to respectively form the first electrode terminal 141 and the second electrode terminal 142 of the cell 100. In this case, the first electrode terminal 141 and the second electrode terminal 142 are respectively located on the two ends of the cell 100 in the first direction A. Certainly, in other embodiments, the first electrode and the second electrode located on the two ends of the electrode core string may be led out through the same cover plate 112 to respectively form the first electrode terminal 141 and the second electrode terminal 142 of the cell 100. In this case, the first electrode terminal 141 and the second electrode terminal 142 are located on the same end of the cell 100 in the first direction A.

In some other implementations, the case body 111 may be provided with an opening on only one end, and one cover plate 112 may be arranged. The one cover plate 112 is connected with the opening on the one end of the case body 111. In this manner, the first electrode and the second electrode located on the two ends of the electrode core string are led out through the same cover plate 112 to respectively form the first electrode terminal 141 and the second electrode terminal 142 of the cell 100. In this case, the first electrode terminal 141 and the second electrode terminal 142 are located on the same end of the cell 100.

The first electrode and the second electrode located on the two ends of the electrode core string may not be led out through the cover plate 112. Instead, the first electrode terminal 141 and the second electrode terminal 142 are arranged on the cover plate(s) 112. The first electrode terminal and the second electrode terminals may be arranged on the same cover plate 112, or may be respectively arranged on the two cover plates 112. In this case, the first electrode and the second electrode located on the two ends of the electrode core string are respectively electrically connected with the first electrode terminal and the second electrode terminal on the cover plate 112. Details are not described in detail herein.

The multiple electrode core assemblies 12 may be connected together through a combination of series connection and parallel connection. For example, the multiple electrode core assemblies 12 may form two electrode core strings. Specifically, the multiple electrode core assemblies 12 may be divided into two parts. The electrode core assemblies 12 in each part are connected in series to form an electrode core string. The two electrode core strings are connected in parallel. In an embodiment, the multiple electrode core assemblies 12 may be properly divided into three or more parts. The electrode core assemblies 12 in each part are connected in series to form an electrode core string. The multiple electrode core strings are connected in parallel.

It may be understood that the multiple electrode core assemblies 12 in the cell 100 are divided into multiple parts. The multiple electrode core assemblies 12 in each part are connected in series to form an electrode core string, so that each electrode core string can have a set voltage to satisfy operating requirements. Moreover, the multiple electrode core strings are connected in parallel, so that electric capacities of the multiple electrode core strings can be combined.

Therefore, the cell 100 has a relatively large electric capacity, which helps prolong a power supply time of the cell 100.

In this embodiment of the present disclosure, a packaging film 13 is further arranged between the metal case 11 and the electrode core assembly 12. That is to say, the electrode core assembly 12 is sealed in the packaging film 13. In this way, double packaging of the electrode core assembly 12 can be achieved by the packaging film 13 and the metal case 11, which helps improve a sealing effect of the cell 100. It may be understood that the packaging film 13 is further filled with an electrolyte solution. In this way, contact between the electrolyte solution and the metal case 11 can be prevented, thereby preventing corrosion of the metal case 11 or decomposition of the electrolyte solution.

An air pressure between the metal case 11 and the packaging film 13 is lower than an air pressure outside the metal case 11, and an air pressure inside the packaging film 13 is lower than the air pressure between the metal case 11 and the packaging film 13.

In the present disclosure, the "air pressure" is an abbreviation for an atmospheric pressure, and is an atmospheric pressure applying on a unit area, which is equal to a weight of a vertical column of air extending upward to an upper boundary of the atmosphere on a unit area.

The air pressure between the metal case 11 and the packaging film 13 is the air pressure in a space between the metal case 11 and the packaging film 13, and is lower than the air pressure outside the metal case 11. Therefore, in this embodiment of the present disclosure, the space between the metal case 11 and the packaging film 13 is in a negative pressure state. In this way, the metal case 11 is recessed or deformed under the action of atmospheric pressure, so that the gap between the metal case 11 and the electrode core assembly 12 decreases, and a space for arbitrary movement of the electrode core assembly 12 or displacement relative to each other is reduced. Therefore, the arbitrary movement of the electrode core assembly 12 and displacement of the electrode core assemblies 12 relative to each other can be reduced, and stability of the cell 100, strength of the cell 100, and safety of the cell 100 can be improved.

For example, the space between the metal case 11 and the packaging film 13 may be vacuumed, so that the space between the metal case 11 and the packaging film 13 is in a negative pressure state. In this way, the metal case 11 and the inner electrode core assembly 12 can be as close as possible, so that the inner gap can be reduced, thereby preventing the electrode core from arbitrarily moving in the metal case. In addition, displacement of the electrode cores relative to each other can be avoided, and damage to a current collector, wrinkling of a separator, and falling of an active material can be reduced, thereby improving mechanical strength of the entire cell 100, increasing a service life of the cell 100, and improving the safety of the cell 100.

In an implementation, a value of the air pressure between the metal case 11 and the packaging film 13 is P1, and P1 may range from −100 Kpa to −5 Kpa.

Certainly, those skilled in the art may set P1 according to an actual need. In other embodiments, P1 may range from −75 Kpa to −20 Kpa. It should be noted that the space between the metal case 11 and the packaging film 13 may be in a vacuum state.

A value of the air pressure in the packaging film 13 is P2, and P2 may range from −100 Kpa to −20 Kpa.

P1 may be greater than P2. A ratio between P1 and P2 ranges from 0.05 to 0.85.

P1, P2, and the ratio between P1 and P2 are defined within the above range, and in the technology, the electrode core assembly 12 adopts a double sealing mode. The electrode core assembly 12 of the cell is first sealed in the packaging film 13. In order to avoid damage to the packaging film 13 as a result of bulging of the packaging film 13 caused by an excessive internal air pressure, the air pressure between the metal case 11 and the packaging film 13 is required to be greater than the air pressure inside the packaging film 13. It has been verified through a large number of experiments that, when the ratio between P1 and P2 is within the above range, relative desirable reliability of the double sealing of the cell 100 is ensured. In addition, a gap between plates is avoided, so that lithium ions can be conducted more effectively.

In this embodiment of the present disclosure, one packaging film 13 is arranged, and the multiple electrode core assemblies 12 in series connection are sealed in the one packaging film 13. For two electrode core assemblies 12 in series connection, a position where the first electrode 121 of one electrode core assembly 12 is connected with the second electrode 122 of the other electrode core assembly 12 is provided in the packaging film 13. That is to say, the packaging film 13 is integrally arranged, and the multiple electrode core assemblies 12 are sealed in the packaging film 13.

Figures 6, 7:
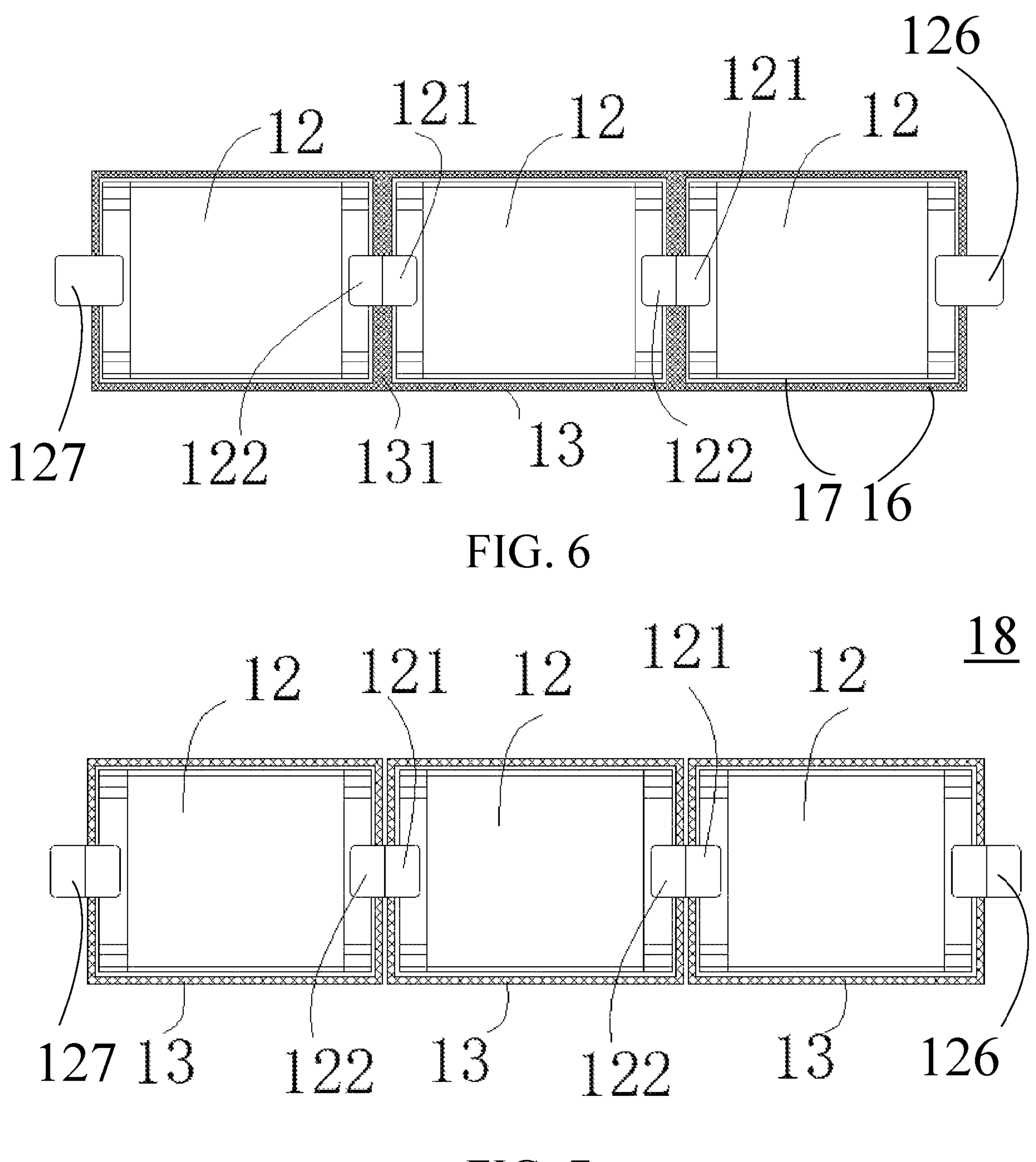
FIG. 6 is a schematic diagram of an electrode core assembly sealed in a packaging film according to an embodiment of the present disclosure.
FIG. 7 is another schematic diagram of the electrode core assembly sealed in the packaging film according to an embodiment of the present disclosure.

For example, as shown in FIG. 6, the multiple electrode core assemblies 12 may be first connected in series, and then the electrode core assemblies 12 connected in series are wrapped by the integral packaging film 13. For example, the electrode core assemblies 12 connected in series may be first placed on a part of the packaging film 13 (or a groove may be provided on a part of the packaging film 13 in advance, and then the electrode core assemblies 12 in series connection are placed in the groove), then another part of the packaging film 13 is folded toward the electrode core assemblies 12, and then the packaging films 13 in the two regions are sealed by hot melting. In this way, the electrode core assemblies 12 connected in series are sealed in the same packaging film 13.

It may be understood that, a packaging portion 131 is formed at a position in the packaging film 13 corresponding to the first electrode 121. In an embodiment, a packaging portion 131 is formed at a position in the packaging film 13 corresponding to the second electrode 122. In an embodiment, a packaging portion 131 is formed at a position in the packaging film 13 corresponding to both of the first electrode 121 and the second electrode 122. Two adjacent electrode core assembly bodies 123 are isolated from each other by the packaging portion 131. For two adjacent electrode core assemblies 12, at least one of the first electrode 121 of one electrode core assembly 12 and the second electrode 122 of the other electrode core assembly 12 is provided in the packaging portion 131. Since the multiple electrode core assembly bodies 123 are isolated by the packaging portion 131, electrolyte solutions of the multiple electrode core assemblies 12 are prevented from circulating, and the multiple electrode core assemblies 12 do not affect each other. In addition, the electrolyte solutions of the multiple electrode core assemblies 12 are prevented from decomposing as a result of an excessively large potential difference, thereby ensuring the safety and the service life of the cell 100.

The packaging portion 131 may be implemented in various ways. For example, the packaging portion 131 may be formed by fastening a packaging film 13 with a tie. In an embodiment, the packaging portion 131 may be formed by directly thermally fusing and connecting the packaging film 13. In an embodiment, the packaging portion 131 may be formed by directly arranging a separator between two electrode core assemblies 12. The specific implementation of the packaging portion 131 is not particularly limited.

In another embodiment of the present disclosure, as shown in FIG. 7, multiple packaging films 13 are arranged. At least one electrode core assembly 12 is sealed in one packaging film 13 to form an electrode core assembly. The multiple electrode core assemblies are connected in series.

A number of packaging films 13 and a number of electrode core assemblies 12 are in a one-to-one correspondence. Each electrode core assembly 12 is independently sealed in one packaging film 13. In this implementation, after the multiple electrode core assemblies 12 are manufactured, one packaging film 13 may be sleeved outside each electrode core assembly 12, and then the multiple electrode core assemblies are connected in series.

At least one of the first electrode 121 and the second electrode 122 of the electrode core assemblies 12 extends out of the packaging film 13. For example, the first electrode 121 may extend out of the packaging film 13, or the second electrode 122 may extend out of the packaging film 13, or both the first electrode 121 and the second electrode 122 extend out of the packaging film 13. That is to say, at least one first electrode 121 extends out of the packaging film 13. In an embodiment, at least one second electrode 122 extends out of the packaging film 13. In an embodiment, at least one first electrode 121 and at least one second electrode 122 extend out of the packaging film 13. The electrode core assembly may be connected in series with other electrode core assemblies by the extended electrodes.

In this embodiment of the present disclosure, a direction in which the multiple electrode core assemblies 12 are arranged is the first direction A, the length direction of the electrode core assemblies 12 extends along the first direction A, and the length of the cell 100 extends along the first direction A. That is to say, the multiple electrode core assemblies 12 are arranged in sequence along the length direction of the cell 100, and the first electrode 121 and the second electrode 122 of the electrode core assembly 12 are respectively arranged on the two sides of the electrode core assembly 12 along the first direction A. That is to say, the multiple electrode core assemblies 12 are in a "head-to-head" arrangement. This arrangement can facilitate series connection of the electrode core assemblies 12 in pairs, and realizes a relatively simple connection structure. In addition, this arrangement can help manufacture a relatively long cell 100. Thus, when the cell 100 is mounted in a housing of the battery pack, support structures such as cross bars and longitudinal bars are not required to be arranged, and the cell 100 is directly mounted to the housing of the battery pack and supported by the metal case 11 of the cell 100, thereby reducing an occupied internal space of the battery pack, improving a volume utilization of the battery pack, and helping reduce a weight of the battery pack.

By arranging the multiple electrode core assemblies 12 in the cell 100, the relatively long cell 100 can be manufactured more conveniently than the related art in which only one electrode core is arranged. A copper-aluminum foil in a relatively long conventional cell used as a current collector is relatively long, which greatly increases an internal resistance of the cell and cannot satisfy current requirements for increasing power and fast charging. In case of a same cell length, this embodiment of the present disclosure can greatly reduce the internal resistance of the cell to avoid problems such as overheating of the cell caused during high power outputting, fast charging, or the like.

Figure 8:
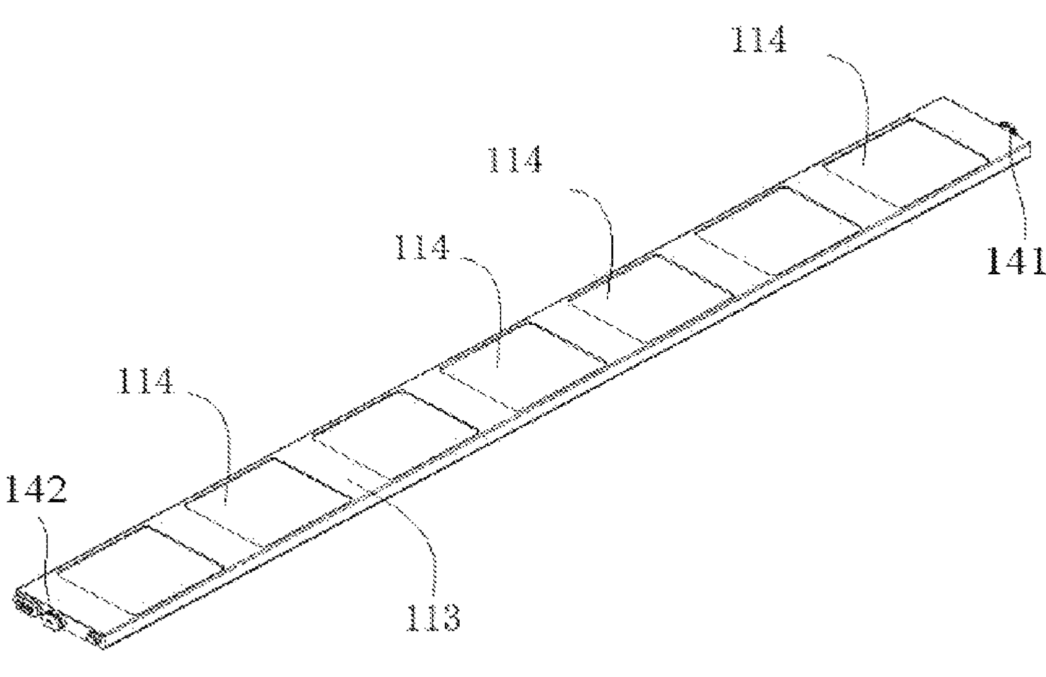
FIG. 8 is a schematic diagram of a first surface of a metal case having recesses formed thereon according to an embodiment of the present disclosure.

As shown in FIG. 8, the metal case 11 has two opposite first surfaces 113 along the second direction B perpendicular to the first direction A. The first surface 113 is a largest surface of the cell 100. At least one of the first surfaces 113 is recessed into the metal case 11, so that the metal case 11 and the electrode core assembly 12 can be attached as closely as possible.

Since the metal case is a relatively thin sheet 11 with a relatively small thickness, a recess 114 on the first surface 113 of the metal case 11 may be, for example, formed when the inside of the metal case 11 is vacuumed. That is to say, during vacuuming of the space between the metal case 11 and the packaging film 13, the air pressure between the metal case 11 and the packaging film 13 is lower than the air pressure outside the metal case 11. As the vacuuming proceeds, the first surface 113 of the metal case 11 tends to be recessed into the metal case 11 to form the recess 114.

During normal use of the cell 100, the cell usually expands as result of expansion of a material of the cell, gas production by an electrolyte solution, and the like, and the largest surface of the cell usually expands and deforms mostly. In this technology, the largest surface of the cell in an initial state is defined in a slightly recessed state by vacuuming. In this way, squeeze between the cells after the cells expand can be effectively relieved, thereby increasing lives and safety of the cells and the entire system.

In some other embodiments, as shown in FIG. 8, the inside of the metal case 11 may be vacuumed after the recess is formed on the first surface 113 of the metal case 11 in advance. Multiple recesses 114 may be arranged on the first surface 113 of the metal case 11. For example, multiple recesses 114 are formed on the first surface 113 in advance, and a position of each of the recesses 114 corresponds to a position of one electrode core assembly 12.

In some implementations, the two opposite first surfaces 113 of the metal case 11 are recessed both inward, so as to hold the electrode core assembly 12 through recessed regions.

At least one exhaust hole may be provided on the metal case 11, and the space between the metal case 11 and the packaging film 13 is vacuumed through the exhaust hole. The exhaust hole is required to be sealed. Therefore, a sealing member is further arranged in the exhaust hole to seal the exhaust hole. The sealing member may be, for example, a plug, a rubber member, or the like. This is not limited.

In some implementations, before the metal case 11 is vacuumed, a gap is provided between the electrode core assembly 12 and an inner surface of the metal case 11. The gap facilitates mounting of the electrode core assembly 12 into the metal case 11. After the metal case 11 is vacuumed, the metal case 11 is pressed against an outer surface of the electrode core assembly 12 along the second direction to hold the electrode core assembly 12, so as to reduce the space inside the metal case 11 for the arbitrary movement of the electrode core assembly 12, thereby improving the safety of the cell 100.

In this embodiment of the present disclosure, the metal case 11 has high strength and effective heat dissipation. The metal case 11 may include but is not limited to an aluminum case or a steel case. In some embodiments, a thickness of the metal case 11 ranges from 0.05 mm to 1 mm.

A relatively large thickness of the metal case 11 increases the weight of the cell 100 and reduces the capacity of the cell 100. In addition, due to the excessively large thickness of the metal case 11, the metal case 11 cannot be easily recessed or deformed toward the electrode core assembly 12 under the action of the atmospheric pressure. As a result, the distance between the metal case 11 and the electrode core assembly 12 cannot be reduced, and the electrode core assembly 12 cannot be effectively positioned. Moreover, the excessively large thickness of the metal case 11 increases costs for vacuuming, thus increasing manufacturing costs.

In the present disclosure, by defining the thickness of the metal case 11 in the above range, not only strength of the metal case 11 can be ensured, but also the capacity of the cell 100 is prevented from decrease. Moreover, the metal case 11 can be deformed more easily in the negative pressure state, so that the distance between the metal case 11 and the electrode core assembly 12 can be reduced, thereby reducing arbitrary movement of the electrode core assembly 12 inside the metal case 11 and displacement of the electrode core assemblies 12 relative to each other.

In this embodiment of the present disclosure, the packaging film 13 includes a non-metallic outer film layer 16 and a non-metallic inner film layer 17 that are stacked, and the inner film layer 17 is arranged between the outer film layer 16 and the electrode core assembly 12.

The inner film layer has desirable chemical stability, for example, may be made of a material having resistance to corrosion by the electrolyte solution. For example, the material may be polypropylene (PP), polyethylene (PE), or polyethylene terephthalate (PET), or may be a combination of more than one of the above materials.

The outer film layer is a protective layer. By using the outer film layer, penetration of air, especially water vapor, oxygen, and the like can be prevented. The material of the outer film layer may be, for example, PET, polyamide (PA), or PP, or may be a combination of more than one of the above materials.

In the packaging film 13 of this embodiment, a melting point of the outer film layer is greater than a melting point of the inner film layer. Therefore, during sealing by hot melting, the outer film layer is not melted, but the inner film layer can be melted in time to ensure excellent sealing performance.

A difference between the melting point of the outer film layer and the melting point of the inner film layer ranges from 30° C. to 80° C. For example, the difference between the two melting points may be 50° C., 70° C., or the like. A specific material may be determined according to actual requirements.

The non-metallic outer film layer and the non-metallic inner film layer are bonded and combined by an adhesive. For example, a material of the outer film layer may be PP, a material of the inner film layer may be PET, and a binder for bonding the outer film layer and the inner film layer may be, for example, a polyolefin binder, so as to form a complex film by bonding.

In this embodiment, a double-layer non-metallic film 13 is used to form a packaging film to package the electrode core assembly 12. Since the non-metallic packaging film 13 has a higher tensile strength and a higher elongation at break, limitation on the thickness of the cell 100 can be reduced, so that the produced cell 100 has a larger thickness. The thickness of the cell 100 in this embodiment may be increased by a wide range. For example, the thickness may be greater than 10 mm, for example, may range from 13 mm to 75 mm.

In some implementations of the present disclosure, the packaging film 13 may an aluminum-plastic film.

In an embodiment of the present disclosure, the cell 100 is a lithium-ion cell.

Referring to FIG. 2 and FIG. 3, the battery pack 200 includes a cell array 21. One or more cell arrays 21 may be arranged, and one or more cells 100 may be arranged in each cell array 21. In actual production, the number of cells 100 and the number of cell arrays 21 may be set according to actual requirements. This is not specifically limited in the present disclosure.

In this embodiment of the present disclosure, the length direction of the cell 100 extends along the first direction A (that is, the length direction of the vehicle 300), the thickness direction of the cell extends along the second direction B (that is, the width direction of the vehicle 300) perpendicular to the first direction A, the multiple cells 100 are arranged in sequence along the second direction B to form the cell array 21, and the multiple cells 100 are connected in series by a connecting piece. It may be understood that, in the same cell array 21, the electrode terminals of two adjacent cells 100 on a same end along the first direction A have opposite polarities, thereby facilitating the series connection by the connecting piece.

A gap is provided between at least two adjacent cells 100. A ratio of the gap to the thickness of the cell 100 ranges from 0.001 to 0.15.

The gap between two adjacent cells varies with an increase of an operating time of the cells. During operations, after operations, or before the cells leave the factory, as long as the ratio of the gap between the cells to the thickness falls within the scope defined in the present disclosure, the gap falls within the protection scope of the present disclosure.

In the present disclosure, a certain gap is reserved between the cells 100 to reserve a buffer space for expansion of the cells 100.

The expansion of the cells 100 is related to the thicknesses of the cells 100. A cell 100 with a larger thickness is more likely to expand. In the present disclosure, the ratio of the gap between the cells 100 to the thickness of the cell 100 is defined from 0.001 to 0.15. In this way, a space of the battery pack 200 can be fully used, thereby improving a utilization of the battery pack 200, and relatively effective cushion can be provided for the expansion of the cells 100.

Heat is generated when the cell 100 expands. Therefore, the gap reserved between the cells 100 can be used as a heat dissipation channel, such as an air channel, so that heat of the surface of the cell 100 with a larger area can be dissipated more effectively. In this way, heat dissipation efficiency of the battery pack 200 can be further improved, and the safety of the battery pack 200 can be provided.

In the above solution, the gap between the cells 100 may mean that a certain space is simply reserved between the cells 100 and no structural member is arranged between the cells, or may mean that an additional structural member is arranged between the cells 100 to separate the cells 100 from each other.

When a structural member is arranged between the cells 100, the gap between the cells 100 is understood as a distance between the cells 100 on two sides of the structural member rather than a distance between the structural member and each cell 100.

A certain gap may be reserved between the structural member and each of the cells 100 on the two sides of the structural member, or the structural member may be in direct contact with the cells. When the structural member is in direct contact with the cells 100 located on the two sides, the structural member is required to have a certain flexibility, so as to provide cushion for the expansion of the cells 100. The structural member includes but is not limited to an aerogel, a thermally conductive structural adhesive, or a thermal insulation foam.

In the present disclosure, when multiple cell arrays 21 are arranged, the gap means a distance between two adjacent cells 100 in a same cell array 21 rather than a distance between two adjacent cells in different cell arrays 21. In addition, in the same cell array 21, a certain gap may be reserved between every two adjacent cells, or a certain gap may be reserved between some two adjacent cells.

In an implementation, the gap between two adjacent cells 100 includes a first gap d1. The first gap d1 is defined as a minimum distance between the two cover plates 112 of the two adjacent cells 100 located on a same side. The thickness of the cell 100 is a dimension of the cover plate 112 along the second direction B. A ratio of the first gap d1 to the thickness of the cell 100 ranges from 0.005 to 0.1.

In the above implementation, since the cover plate 112 has relatively high strength, the cover plate is less likely to expand than the case body 111. After the cell 100 operates for a period of time, a chemical reaction occurs inside the cell, and the cell 100 expands and squeezes an adjacent cell 100, and therefore the first gap d1 changes (for example, the first gap gradually increases). However, the change is relatively small and can be ignored. In an embodiment, even if the first gap changes, the ratio of the first gap d1 to the thickness of the cell 100 still satisfies the above range. In the above implementation, each of two ends of the case body 111 is provided with the cover plate 112. When the cells 100 are arranged into the cell array 21 along the thickness direction, the gap between the two cells 100 is a minimum distance between two cover plates 112 located on a same end of the cell array 21 rather than a distance between two cover plates 112 located on different ends of the cells 100.

In an implementation, the gap between the two adjacent cells 100 includes a second gap. The second gap is a minimum distance between two first surfaces 113 of the two adjacent cells 100 facing each other. The second gap of the cell 100 before use is larger than the second gap after use.

The expression "before use" may be understood as a time point before the cell 100 is delivered from the factory after assembly or before the cell starts supplying electric energy to the outside after the cell is delivered from the factory. The expression "after use" may be understood as a time point after the cell 100 starts supplying electric energy to the outside. For example, the battery pack 200 is assembled on an electric vehicle. In this case, the state before use may be understood as a state of the new vehicle, and the state after use is understood as a state of the vehicle after traveling by a mileage.

In this implementation, the second gap is a minimum distance between two opposite first surfaces 113 of two adjacent cells 100, and the distance gradually decreases with a service time of the cells 100. A main reason is that after the cells 100 expand, the distance between two adjacent largest surfaces 113 gradually decreases.

As shown in FIG. 2, in this embodiment of the present disclosure, the battery pack 200 further includes a battery cover and a tray 22. The battery cover is not shown in FIG. 2. The battery cover and the tray 22 are hermetically connected to form a battery accommodating cavity, and the cell array 21 is arranged in the battery accommodating cavity. The tray 22 includes a side beam 221, and a support region is formed on the metal case 11 of the cell 100. The cell 100 is butted with the side beam 221 by the support region and is supported on the side beam 221. Specifically, the two ends of the cell 100 along the length direction thereof are supported on the side beam 221.

In the cell 100 of this embodiment of the present disclosure, the air pressure between the metal case 11 and the packaging film 13 is negative pressure, which can improve an overall strength of the cell. Therefore, the cell 100 may be directly mounted to the tray 22 by using the strength of the cell as a support. In this way, the structure such as a cross bar or a longitudinal bar is not required to be arranged on the tray 22 to support the cell 100, thereby helping increase the utilization of the internal space of the battery pack 200, and a relatively large number of cells 100 can be mounted, thereby further increasing the electric capacity of the battery pack 100.

Referring to FIG. 1, the present disclosure further provides a vehicle 300 including the above battery pack 200. The vehicle 300 has the same advantages as the above battery pack 200 with respect to the related art, and therefore is not described in detail herein.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, exemplary descriptions of the foregoing terms do not necessarily refer to the same embodiment or example. Moreover, the specific features, structures, materials, or characteristics described may be combined in any one or more embodiments or examples in an appropriate manner.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery pack, fixed to a vehicle and configured to provide electric energy for the vehicle, wherein the battery pack comprises a cell array;

the cell array comprises a plurality of cells;

each of the cells comprises electrode terminals for leading out current, and the electrode terminals of each of the cells comprise a first electrode terminal and a second electrode terminal, wherein a length of each of the cells extends along a first direction, and the first direction is extending between a front and a rear of the vehicle;

the first electrode terminal and the second electrode terminal are respectively arranged on two opposite ends of each of the cells, the two opposite ends facing the front or the rear of the vehicle, respectively; and each of the cells comprises a metal case and a plurality of electrode core assemblies sealed in the metal case along the first direction and electrically connected in series to form an electrode core string, the metal case comprises a case body with an opening and a cover plate, and a third electrode and a fourth electrode respectively on two ends of the electrode core string are led out through the cover plate to respectively form the first electrode terminal and the second electrode terminal.

2. The battery pack according to claim 1, wherein a thickness of each of the cells extends along a second direction perpendicular to the first direction; and the cells are arranged along the second direction to form the cell array.

3. The battery pack according to claim 2, wherein both the first electrode terminal and the second electrode terminal are arranged on the end facing the front or the rear of the vehicle.

4. The battery pack according to claim 2, wherein a ratio of the length of each of the cells to a length of the vehicle ranges from 0.2 to 0.8.

5. The battery pack according to claim 4, wherein the length of each of the cells ranges from 600 mm to 2500 mm.

6. The battery pack according to claim 2, wherein each of the electrode core assemblies comprises at least one electrode core; the electrode core assemblies are sealed in a packaging film; and an air pressure between the metal case and the packaging film is lower than an air pressure outside the metal case; and an air pressure inside the packaging film is lower than the air pressure between the metal case and the packaging film.

7. The battery pack according to claim 6, wherein each of the electrode core assemblies comprises an electrode core assembly body and a first electrode and a second electrode electrically connected with the electrode core assembly body; and the first electrode and the second electrode are respectively arranged on two sides of the electrode core assembly body along the first direction; and for two adjacent electrode core assemblies, a first electrode of a first electrode core assembly of the two adjacent electrode core assemblies is electrically connected with a second electrode of a second electrode core assembly of the two adjacent electrode core assemblies.

8. The battery pack according to claim 7, wherein the two adjacent electrode core assemblies are electrically connected at a position in the packaging film; and the packaging film includes a packaging portion formed at a position in the packaging film corresponding to the first electrode and/or the second electrode; two adjacent electrode core assembly bodies are isolated from each other by the packaging portion; and for the two adjacent electrode core assemblies, at least one of the first electrode of the first electrode core assembly and the second electrode of the second electrode core assembly is provided at the packaging portion.

9. The battery pack according to claim 7, further comprising a plurality of packaging films including the packaging film, wherein at least one of the electrode core assemblies is sealed in one of the packaging films to form a sealed electrode core assembly; and at least one of first electrodes and/or at least one of second electrodes of the sealed electrode core assembly extends out of the packaging film corresponding to the sealed electrode core assembly.

10. The battery pack according to claim 7, wherein the cover plate is connected with the opening of the case body to form an accommodating chamber; and the electrode core string is arranged in the accommodating chamber.

11. The battery pack according to claim 10, wherein the case body comprises two opposite first surfaces along the second direction; and at least one of the two opposite first surfaces is recessed into the metal case.

12. The battery pack according to claim 11, wherein a gap is provided between two adjacent cells; and a ratio of the gap to a thickness of the two adjacent cells ranges from 0.001 to 0.15.

13. The battery pack according to claim 12, wherein the gap comprises a first gap; the first gap is a minimum distance between two cover plates of the two adjacent cells on a same side; and a ratio of the first gap to the thickness of the two adjacent cells ranges from 0.005 to 0.1.

14. The battery pack according to claim 12, wherein the gap comprises a second gap; the second gap is a minimum distance between the two opposite first surfaces of the two adjacent cells facing each other; and the second gap of the cell before use of the cells is larger than the second gap after the use.

15. The battery pack according to claim 6, wherein at least one exhaust hole is provided on the metal case; and a sealing member is arranged in the exhaust hole.

16. The battery pack according to claim 6, wherein the air pressure between the metal case and the packaging film is P1; and P1 ranges from −100 Kpa to −5 Kpa.

17. The battery pack according to claim 16, wherein the air pressure in the packaging film is P2; and P2 ranges from −100 Kpa to −20 Kpa; and P1 is greater than P2; and a ratio between P1 and P2 ranges from 0.05 to 0.85.

18. The battery pack according to claim 6, wherein the packaging film comprises a non-metallic outer film layer and a non-metallic inner film layer that are stacked on each other; the inner film layer is arranged between the electrode core assemblies and the outer film layer; a melting point of the outer film layer is greater than a melting point of the inner film layer; and a difference between the melting point of the outer film layer and the melting point of the inner film layer ranges from 30° C. to 80° C.

19. The battery pack according to claim 6, further comprising a battery cover and a tray engaged with the battery cover, wherein the tray comprises a side beam to form a support region on the metal case; the battery cover and the tray are connected to form a battery accommodating cavity; the cell array is arranged in the battery accommodating cavity; and the cells are supported on the side beam in the support region.

20. A vehicle, comprising a battery pack configured to provide electric energy for the vehicle, wherein the battery pack comprises a cell array;

the cell array comprises a plurality of cells;

each of the cells comprises electrode terminals for leading out current, and the electrode terminals of each of the cells comprise a first electrode terminal and a second electrode terminal, wherein a length of each of the cells extends along a first direction, and the first direction is extending between a front and a rear of the vehicle;

the first electrode terminal and the second electrode terminal are respectively arranged on two opposite ends of each of the cells, the two opposite ends facing the front or the rear of the vehicle, respectively; and each of the cells comprises a metal case and a plurality of electrode core assemblies sealed in the metal case along the first direction and electrically connected in series to form an electrode core string, the metal case comprises a case body with an opening and a cover plate, and a third electrode and a fourth electrode respectively on two ends of the electrode core string are led out through the cover plate to respectively form the first electrode terminal and the second electrode terminal.

21. The vehicle according to claim 20, wherein the battery pack is arranged at a bottom of the vehicle.

* * * * *